(12) United States Patent
Dichtl et al.

(10) Patent No.: US 8,660,262 B2
(45) Date of Patent: Feb. 25, 2014

(54) METHOD AND DEVICE FOR GENERATING RANDOM WAIT STATES

(75) Inventors: Markus Dichtl, Munich (DE); Bernd Meyer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 12 days.

(21) Appl. No.: 13/560,522

(22) Filed: Jul. 27, 2012

(65) Prior Publication Data

US 2013/0028413 A1 Jan. 31, 2013

(30) Foreign Application Priority Data

Jul. 28, 2011 (DE) .......................... 10 2011 052 230

(51) Int. Cl.
*H04K 1/00* (2006.01)
*H04L 9/00* (2006.01)
*H04L 9/28* (2006.01)

(52) U.S. Cl.
USPC .............................................. 380/28; 726/25

(58) Field of Classification Search
USPC .......................................................... 380/28
See application file for complete search history.

(56) References Cited

U.S. PATENT DOCUMENTS

| 5,317,639 | A | * | 5/1994 | Mittenthal | 380/37 |
|---|---|---|---|---|---|
| 6,097,812 | A | * | 8/2000 | Friedman | 380/26 |
| 6,724,894 | B1 | * | 4/2004 | Singer | 380/28 |
| 8,345,863 | B2 | * | 1/2013 | Baek et al. | 380/30 |
| 2005/0232430 | A1 | * | 10/2005 | Gebotys | 380/286 |
| 2005/0240782 | A1 | * | 10/2005 | Hubert | 713/300 |
| 2010/0036899 | A1 | * | 2/2010 | Kaluzhny | 708/251 |
| 2010/0098242 | A1 | * | 4/2010 | Xiao et al. | 380/28 |
| 2011/0261953 | A1 | * | 10/2011 | Guilley et al. | 380/2 |
| 2012/0124669 | A1 | * | 5/2012 | Carpenter et al. | 726/25 |

\* cited by examiner

*Primary Examiner* — Mohammad W Reza
*Assistant Examiner* — Monjour Rahim
(74) *Attorney, Agent, or Firm* — Murphy, Bilak & Homiller, PLLC

(57) ABSTRACT

A random source for generating a random number r with a bit length k, $r=r_0, \ldots, r_{k-1}$, a memory for storing a threshold value state variable s, which is represented by a number with a bit length $n \geq k$, $s=s_0, \ldots, s_{n-1}$, and a comparator to compare two numbers with a bit length k, i.e. from r with a subset of the bits from s are provided. Two calculation rules R1 and R2, which are able to change the content of the memory for the threshold value state variable s (i.e. functions from s to s), are defined for a method of generating random wait states.

20 Claims, 5 Drawing Sheets

METHOD AND DEVICE FOR GENERATING RANDOM WAIT STATES

PRIORITY CLAIM

This application claims priority to German Patent Application No. 102011052230.1, filed on 28 Jul. 2011, the content of said German application incorporated herein by reference in its entirety.

TECHNICAL FIELD

The instant application relates to security products, and more particularly to generating random wait states.

BACKGROUND

To ensure that a cryptographic method is sufficiently secure against attacks, both the inherent security of the mathematical cryptography algorithm used and the technical implementation are of importance. For example, efforts are made to protect the technical implementation of a cryptographic application against side channel attacks.

Side channel attacks are a class of methods for cryptoanalysis. In contrast to conventional attacks on cryptographic applications, an attacker does not attempt to crack the underlying abstract mathematical algorithm, but attacks a specific technical implementation of a cryptographic method. To do this, the attacker uses accessible physical measurement parameters of the specific implementation such as, for example, the runtime of the calculation, power consumption and electromagnetic radiation of the processor during the calculation of the behavior of the implementation in the event of induced errors. The physical measurement parameters of an individual calculation can be analyzed directly, e.g. by means of a simple power analysis. Alternatively, an attacker can record the measurement values of a plurality of calculations, for example using a storage oscilloscope, and then statistically analyze the measurement values, for example by means of a differential power analysis. Side channel attacks are frequently substantially more effective and therefore also more dangerous than conventional crypto-analytical techniques, and can even crack methods which are regarded as secure from the point of view of the algorithms, if the implementation of these algorithms is not protected against side channel attacks of this type. Countermeasures against side channel attacks are advantageous for all security products (i.e. products using cryptographic methods), for example for smartcards and embedded applications.

A fundamental precondition for the performance of side channel attacks with statistical analysis of the measurement data is the correct alignment of the measurement data. This is understood to mean that the data from different measurements are processed before the analysis in such a way that the switching processes to be observed of the attacked electronics take place in different measurements at the same time relative to the respective reference time and therefore affect the samples of the measurement data which are allocated to one another, i.e. which are then to be statistically compared with one another. Under this precondition, it is possible that the effects of the switching processes from the individual measurements amplify one another to the extent that the attacker has a clearly distinguishable signal, which provides him with information on the secret key material.

Attempts are therefore made in the case of security products to make the alignment of measurement data more difficult for an attacker. An essentially known method for doing so is the generation of random wait states. For this purpose, the hardware and/or software by means of which the cryptographic application to be protected is implemented is provided with a mechanism which pauses the running of the algorithms at random times for one or more clocks. This "faltering" of the run breaks up the calculation at randomly selected places and displaces the pieces in different measurements in a random manner in relation to one another. As a direct consequence, many of the statistical side channel attack techniques fail, or they are at least made substantially more difficult, e.g. in that so many measurement values are required that the attacks are no longer feasible.

FIGS. 1a and 1b show two simulated measurement curves of the type that could be obtained through a side channel attack, for example by means of a storage oscilloscope. In each case, the same time segment of two runs of a cryptographic method can be seen in which random wait states are used. Due to the randomly occurring wait states, the curve of FIG. 1b is displaced in an irregular manner compared with the curve of FIG. 1a. An alignment of the measurement data and consequently a statistical analysis of parameters relevant to the side attack are made significantly more difficult as a result.

However, a disadvantage of known methods for generating random wait states lies in the fact that they represent a performance loss for the application. The main problem here does not necessarily lie in the average performance loss associated with the probability of the occurrence of wait states. Particularly for real-time applications, it is instead more important also to control the maximum performance loss of the application resulting from wait states. This is more difficult, since the number of random wait states fluctuates according to their random nature.

In order to be able to indicate an upper limit for the delay of the running of the application due to random wait states, it would in principle be conceivable, following the occurrence of a wait state, for the generation of further wait states to be blocked for a specific number of clocks. This method would enable an upper limit for the delay of the application due to random wait states, but would induce a complicated and unnatural probability distribution of the wait states as would not be expected from randomly and independently occurring events. Furthermore, it may be that the time windows caused by the dependencies between the wait states in which no new wait states can occur are visible to an attacker and can be used for an attack.

A further disadvantage of known methods for generating random wait states lies in the fact that these methods are only efficient if, for the probabilities of the occurrence of random wait states, powers of 2 of the probability are selected for an individual random bit. The reason for this lies in the fact that these methods are based on digital circuit elements. Other probabilities require complex approximation. An approximation of this type requires a higher number of random bits (depending on the accuracy) in order to generate a single wait state. The data rate at which random wait states can be generated is normally limited as a result.

SUMMARY

According to one embodiment, a method for generating random wait states comprises: (a) obtaining a threshold value from a threshold value state variable by means of a threshold value allocation; (b) comparing the threshold value with a random number, and, depending on the comparison, setting a wait state indicator either to a first value or to a second value, wherein one of these values represents a wait state and the other a non-wait state, in accordance with: b1) if the random number is less than the threshold value, the wait state indicator is set to the first value, and a first calculation rule which does not increase the allocated threshold value is applied to the threshold value state variable; b2) if the random number is greater than the threshold value, the wait state indicator is set to the second value, and a second calculation rule which does not reduce the allocated threshold value is applied to the threshold value state variable; b3) at least in one of b1) and b2), a first limit condition for the threshold value state variable is checked, and if the first limit condition is satisfied, regardless of b1) and b2), the wait state indicator is forcibly set to the value representing the non-wait state; and (c) determining whether to initiate the wait state based on whether the wait state indicator (w) is set to the first or second value.

The conditions b1) to b3) are not to be understood as definitive, e.g. the term "if" is not to be understood in the sense of "whenever". The cases specified in b1) to b3) are instead to be understood in the sense that (at least under specific further conditions) the corresponding conditions are checked and, if they apply, the corresponding steps are carried out. For example, the conditions b1 and b2 are checked in embodiments only if the condition b3 is not satisfied. Condition b3) does not therefore conflict with the conditions b1) and b2). Similarly, it is possible for further cases to be provided in addition to b1) to b3).

In one embodiment, for example, the following further case b4) is provided: b4) at least in one of the cases b1) and b2), a second limit condition for the threshold value state variable is checked, and if the second limit condition is satisfied, regardless of b1) and b2), the wait state indicator is forcibly set to the value representing the wait state.

Further cases in addition to b1) to b3) and b4) can also be provided. One example is the case of equality of the threshold value and the random number. In one embodiment of the invention it is provided that, in the event of equality, the case b1) occurs, and in a further embodiment it is provided that the case b2) then occurs.

The threshold value allocation can be any given function by which a threshold value is allocated to a threshold value state variable. Identical values may also be involved, i.e. in this case the threshold value state variable is identical to the threshold value. In this case, step (a) does not need to be implemented specifically by means of calculation steps, but the threshold value state variable is used directly in the following steps instead of the threshold value. In embodiments, however, the threshold value differs from the threshold value state variable.

A first calculation rule which does not increase the threshold value is to be understood in the sense that the calculation rule acts on any given threshold value state variable in such a way that the threshold value allocated by means of the aforementioned threshold value allocation is reduced or at least remains the same. A calculation rule which, in some threshold value state variables, leaves the threshold value unchanged following a single application and changes it only after a multiple application is therefore also to be regarded as a calculation rule which does not increase the threshold value.

The random number can be obtained from any given random source or pseudo-random source. Pseudo-random numbers, i.e. numbers which are obtained from a deterministic algorithm but have statistical properties of random numbers, are also regarded as random numbers.

Further possible advantageous aspects of the invention are illustrated below. According to one embodiment, the steps a) to c) are repeated several times, in particular in a loop for each clock (or a group of clocks) of a cryptographic application.

According to a further embodiment, the first limit condition (condition indicating whether the threshold value state variable lies outside or at the edge of a limit for its definition area) is defined by non-exceeding or understepping of a predefined lower limit for the threshold value state variable, and the second limit condition (insofar as such a condition is checked) is defined by non-understepping or exceeding of a predefined upper limit for the threshold value state variable, or vice-versa.

According to a further embodiment, the first value represents the wait state, and in this case the first limit condition is checked at least in the case b1), and the second limit condition (insofar as such a condition is checked) is checked in the case b2). Alternatively, the first value represents the non-wait state. In this case, the first limit condition is checked at least in the case b2), and the second limit condition (insofar as such a condition is checked) is checked in the case b1).

According to a further embodiment, the first calculation rule comprises the subtraction of a first value from the threshold value state variable, at least under certain further conditions, e.g. if this does not understep a predefined lower limit. According to a further embodiment, the second calculation rule comprises the addition of a second value to the threshold value state variable, at least under certain further conditions, e.g. if this does not exceed a predefined upper limit.

If the threshold value state variable is represented by a number, the threshold value allocation can be selected in embodiments in such a way that the threshold value rises evenly with the threshold value state variable. This can occur in particular as follows: If the number of possible threshold value state variables (i.e. their value range) exceeds that of the possible threshold values, the threshold value allocation can be effected in such a way that, in the case of some of the possible threshold value state variables, a one-off application of the first calculation rule leaves the allocated threshold value constant, but a multiple application of the first calculation rule reduces the allocated threshold value. The same also applies to the second calculation rule. In a particularly effectively applicable case, the threshold value allocation is carried out through direct use of a subset of bits of the threshold value state variable as bits of the threshold value. In particular, the threshold value state variable may be a number with a bit length n and the threshold value allocation may comprise the use of $k \leq n$ bits of the threshold value state variable as at least a part of the threshold value, preferably the k most significant bits. This allocation has the advantage that, for example, the probability of a wait state does not change or does not substantially change even if a wait state has been obtained only a few times. Only if the wait state has occurred with a greater frequency does the probability change more significantly and/or a non-wait state is finally forced by condition b3). Through this procedure, non-random correlations between wait states are reduced to short timescales and side channel attacks are thus made considerably more difficult.

In general, it is preferred that at least a multiple application of the first calculation rule reduces the allocated threshold value, and/or that at least a multiple application of the second calculation rule increases the allocated threshold value.

According to a further embodiment, the threshold value state variable is initialized as follows: an expected statistical mean value for the threshold value state variable is determined, for example by means of a simulation run of the method or by means of an analytical formula. The threshold value state variable is then set to a value which approximates the statistical mean value within a predefined accuracy, for example to the rounded statistical mean value.

According to a further embodiment, the first and second calculation rules and the first limit condition are selected in such a way that, in the case of multiple performances of the method, more precisely the steps a) to c), a predefined number of non-wait states cannot be understepped, irrespective of the result of the random number r. In this way, it can be ensured that a minimum performance proportion is retained for the cryptographic method.

According to a further aspect of the invention, a cryptographic method is proposed in which the steps a) to c) are repeated several times, preferably once per clock or per a predefined minimum number of clocks.

According to a further aspect of the invention, a device is proposed for processing digitally stored data and a circuit component for generating random wait states. This preferably involves a security product. The device comprises a circuit arrangement which is configured to carry out any given method described herein. For example, the circuit arrangement may comprise a data memory and a processor, optionally also a random source and a comparator. In this case, the data memory contains instructions for the carrying out of any given method described herein for generating random wait states and of the cryptographic method by the processor. In a further example, the circuit arrangement may comprise a finite automaton which is set up to carry out a method described herein, e.g. in the context of a predefined cryptographic algorithm. In other words, the algorithm can be implemented in the form of software, but also in the form of hard-wired hardware, e.g. of the finite automaton.

Embodiments of the invention have the following advantageous characteristics: the probability that any given state is a wait state can be set over a wide range. There is furthermore an upper limit for the number of wait states which can occur in a specific time interval. This upper limit is definable through the selection of suitable system parameters. The method is therefore usable particularly in systems with real-time requirements. The maximum occurring delay due to wait states is therefore definable over a wide range. Furthermore, the method is effectively implementable. Furthermore, the probability of a wait state is relatively freely selectable, and can also differ from a power of two without the need for substantial additional calculation steps.

Those skilled in the art will recognize additional features and advantages upon reading the following detailed description, and upon viewing the accompanying drawings.

BRIEF DESCRIPTION OF THE DRAWINGS

The invention will be explained below with reference to embodiments illustrated in the figures, from which further advantages and modifications can be derived. For this purpose.

DETAILED DESCRIPTION

The method according to one embodiment of the invention is explained in detail below with reference to FIG. 2. According to one embodiment, this method is based on a device which comprises the following components:

A random source for generating a random number r with a bit length k, $r=r_0, \ldots, r_{k-1}$; a memory for storing a threshold value state variable s, which is represented by a number with a bit length $n \geq k$, $s=s_0, \ldots, s_{n-1}$; and a comparator to compare two numbers with a bit length k, i.e. from r with a subset of the bits from s.

Two calculation rules R1 and R2, which are able to change the content of the memory for the threshold value state variable s (i.e. functions from s to s), are furthermore defined for the method. The method is furthermore characterized by the bit lengths k and n, $k \leq n$ already mentioned above where n is the bit length of the threshold value state variable s, and k is the bit length of a random number r and of the threshold value t allocated to the threshold value state variable.

In the present example, the calculation rules R1, R2 are implemented by an adder/subtracter with predefined integral parameters (constants) u and d: $R1(s)=s-d$, and $R2(s)=s+u$. In other words, R1 acts on s by subtracting the parameter d from it, and R2 acts on s by adding the parameter u to it. In addition, it can be checked in R1 and/or R2 that s does not move outside a value range. Thus, for example, in the case of $R2(s)$ the addition can be linked to the additional condition that s is less than a predefined limit value, e.g. to the condition $s<2^n-u$. Analogously, in the case of $R1(s)$, the subtraction can be linked to the additional condition that $s \geq d$. However, given that in the method described below, R1 is in any event used only under this condition (see step S5'), an explicit check of this condition can also be dispensed with.

Any other given functions can be used for R1 and R2, with R1 generally acting on s in such a way that the allocated threshold value t is not increased, and R2 acting on s in such a way that the allocated threshold value t is not reduced. In the allocation of s and t selected here, R1 also has a non-increasing effect on s, and R2 has a non-reducing effect on s. As a general aspect, the first calculation rule reduces the allocated threshold value t at least for specific threshold value state variables s, and the second calculation rule increases the allocated threshold value t at least for specific threshold value state variables s.

Figure 1A:
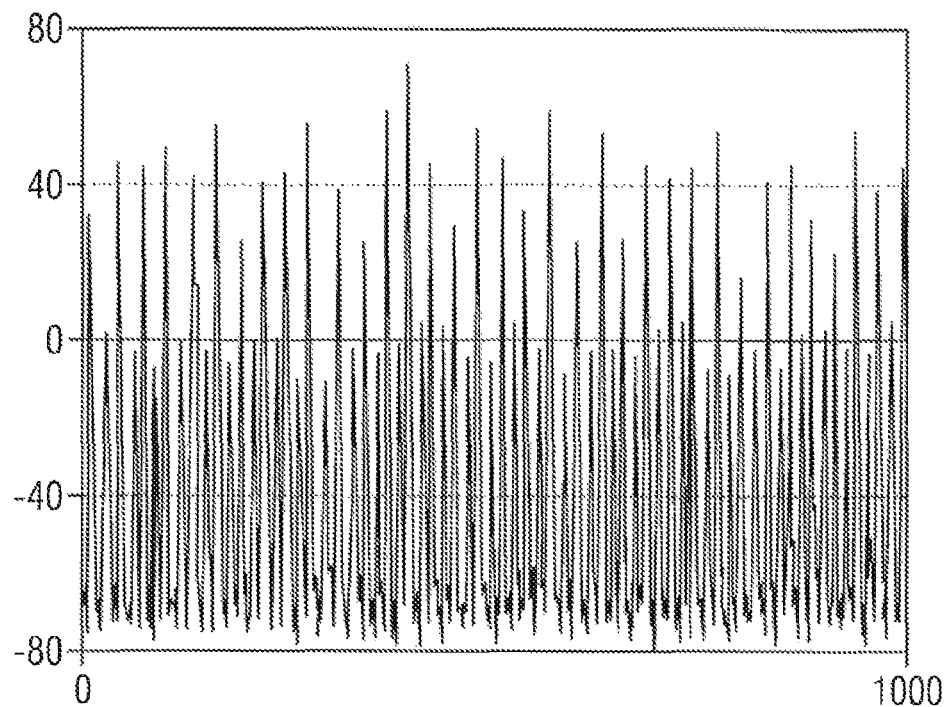
FIGS. 1a and 1b show possible measurement curves occurring in the event of a side channel attack.
Figure 1B:
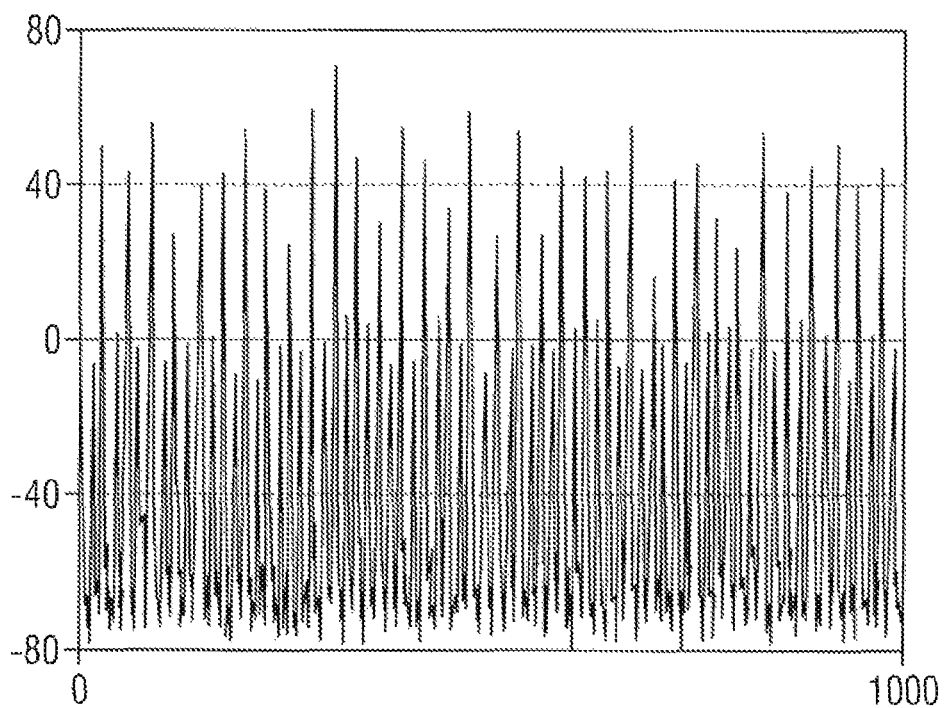
Figure 2:
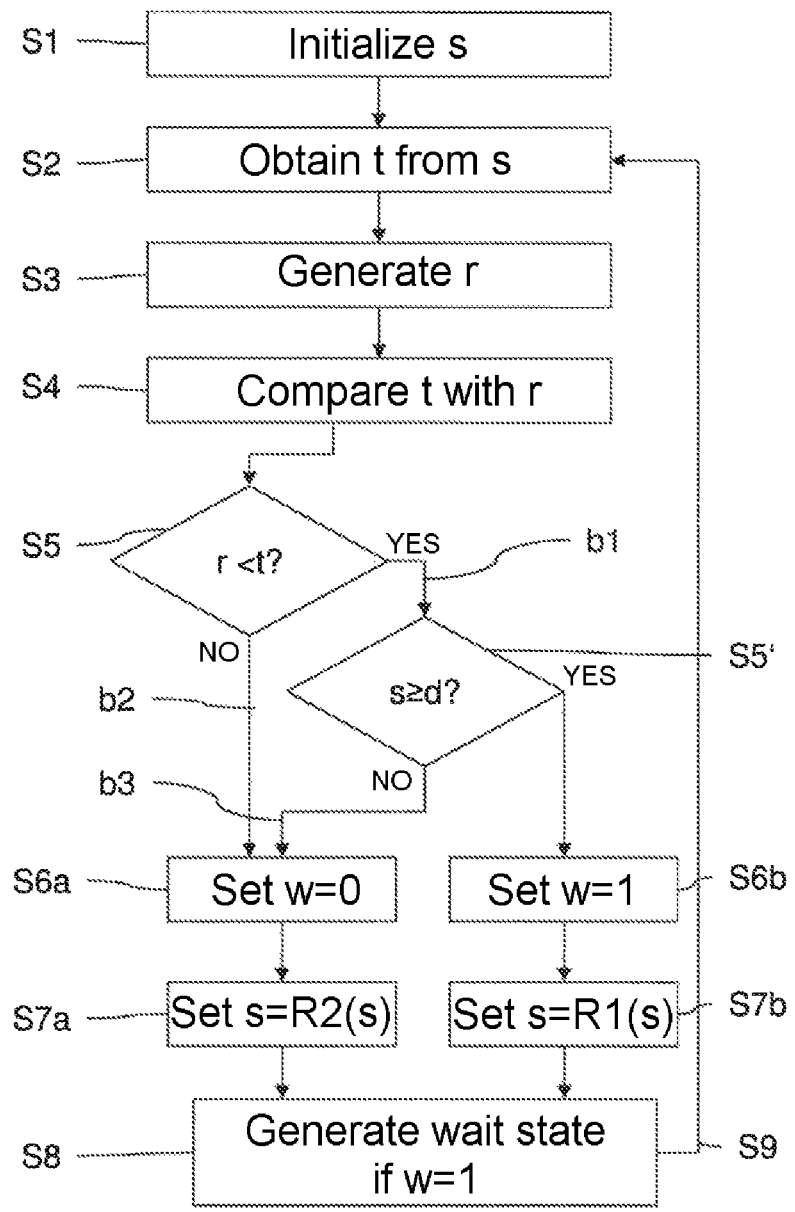
FIG. 2 shows a flow diagram of a method according to one embodiment.

At the beginning of the method illustrated in FIG. 2, in step S1, the threshold value state variable s is initialized with a starting value. The initialization can essentially be effected in any given way, i.e. by means of a random number or in that a value stored in the memory for s is retained unchanged. An advantageous variant of the initialization is described below following equation (1).

Figure 3A:
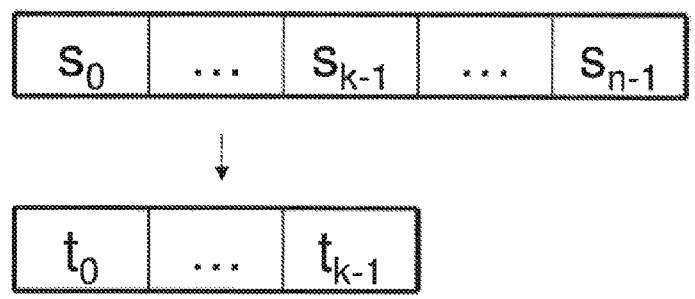
FIGS. 3a and 3b show allocations of the threshold value state variable to a threshold value according to a respective embodiment.

The process control then carries out the following steps S2 to S8 in each system clock (or in each group of system clocks) of a cryptographic application in order to be able to decide whether or not a wait state is to be run in the next clock. In step S2, a threshold value t is obtained from a threshold value state variable s by means of a threshold value allocation. The following allocation illustrated in FIG. 3a is used here: if s is represented by the bits $s_0, \ldots, s_{n-1}$, then t is obtained through their k most significant bits, $t=s_0, \ldots, s_{k-1}$. This threshold value allocation is illustrated in FIG. 3a. The numbers are interpreted here as natural numbers in binary representation. The most significant bit appears on the left, i.e. the index 0 designates the most significant bit. For this allocation illustrated in FIG. 3a, it is not necessary to copy the bits of s to a different storage location, but rather the corresponding part of the memory of s can simply be used for t.

In step S3, a random number $r=r_0, \ldots, r_{k-1}$ with a bit length k is generated. A True Random Number Generator (TRNG) or a Pseudo Random Number Generator (PRNG) or a combination thereof can be used as a random source. The randomness of a TRNG is based on one (or more) physical processes, in which a resulting signal is digitized and post-processed if necessary. Examples include noise sources, radioactive decay, metastable conditions, free-swinging oscillators and/or quantum physical effects. Pseudo random number generators, on the other hand, are based on a deterministic method, deriving their random characteristics from a randomly selected starting value (seed) and the unpredictability of internal interim states of the deterministic transition function. Random sequences generated in this way have what is known as algorithmic entropy, which results from an (assumed) complexity gap between the outlay for calculating a function and for calculating the inverse mapping. Examples include block ciphers and cryptographic hash functions in feedback operating modes or different number theory problems such as factorization of integers, calculation of discrete logarithms in finite Abelian groups, distinction of quadratic residues and non-residues in finite bodies.

In step S4, the threshold value t is then compared with the random number r. As already described above, bit sequences are interpreted as natural numbers in binary representation. The numbers r and t can, in particular, be compared using a comparator.

In the following steps as from S5, depending on the comparison, a wait state indicator w (one bit) is set as follows to the value 0 or 1, where 0 represents a non-wait state and 1 a wait state:

If $r<t$ (checked in step S5) and $s \geq d$ (checked in step S5') then the wait state indicator w, as shown in case b1, is set to the value 1 (i.e. to the value representing a wait state, step S6b), and the calculation rule R1$(s)$=s−d is applied to the threshold value state variables (step S7b). In other words, in step S7b, the amount d is subtracted from s, e.g. by a subtractor.

If one of the conditions checked in steps S5 and S5' is not satisfied, i.e. $r \geq t$ (case b2) or $s<d$ (case b3) or both, the wait state indicator w is set to the value 0 (i.e. to a value representing the non-wait state, step S6a), and the calculation rule R2$(s)$=s+u for $s<2^n-u$, otherwise R2$(s)$=s is applied to the threshold value state variable (step S7a). In other words, in step S7a, the amount u is added to s, e.g. by an adder, if $s<2^n-u$, and otherwise nothing is done.

The comparisons of the memory content s with the constants d and $2^n-u$ (steps S5' and S7a) can similarly be carried out using a comparator, but a more effective implementation can be achieved by means of a direct, hardware-implemented operation.

In step S8, depending on the wait state indicator w, the wait state is then initiated (if w=1) or not (if w=0). Then (step S9), the method is continued again at step S2 in the following system clock.

The method described in FIG. 2 can optionally be supplemented as follows. Following step S5, the following step can be supplemented in the case b2, before S6a: as a second limit condition for the threshold value state variable s, a check is carried out to ascertain whether $s>(2^n-1-u)$. If the second limit condition is satisfied, the method is forcibly continued with step S6b and the wait state indicator w=1 is set.

In symbolic notation, an implementation of the method shown in FIG. 2 can be represented as follows:

generate with random source RNG k random bits r= $r_0, \ldots, r_{k-1}$
  set t← $s_0, \ldots, s_{k-1}$
  if r<t and s≥d then
    run a wait state in the next clock
    s←s−d
  else
    do not run a wait state in the next clock
    if $s<2^n-u$ then
      s←s+u
    fi
  fi "if . . . then . . . else . . . fi" designates an "if . . . then . . . else . . . " condition; and the operator "and" designates the logical "and" operation.

In this implementation, the variable threshold value t is thus compared with a random number r. If the random number r is less than t, a wait state is generated in the next clock and the threshold value state variable s is reduced by the constant d (which at least in the case of a multiple application also results in a reduction of t). Otherwise, s is increased by the constant u, and no wait state is generated. If the threshold value state variable s attains a value less than d or greater than $2^n-1-u$, s is no longer adapted, even in order to prevent an underflow or overflow of the memory.

Thus, t can be regarded as a threshold value for a non-wait state. The lower t is, the less probable a wait state becomes, and the higher t is, the more probable a wait state becomes. Since the calculation rule R1 (R2) reduces (increases) the value of t at least in the case of sufficiently frequent application, an increased occurrence of wait states or non-wait states is countered in this way. Depending on the allocation of s to t and the calculation rules R1 and R2 (here: in the case of sufficiently small values of k, u and d), the change in probability may, however, be very slight. In this case, a notable change in probability occurs only after a high number of consecutive identical states. Precisely this may also be desired, depending on the application, given that correlations between temporally closely consecutive wait states are thereby reduced.

The threshold value state variable s thus indirectly (via the threshold value t) regulates the probability that the next clock becomes a wait state. If a wait state has occurred, the probability of wait states in the immediately following clocks is reduced by the reduction of s. Conversely, every clock without a wait state increases the probability of a wait state being run in the next clock.

In addition, due to the case distinction in step S5', a further effect is ascribed to the threshold value state variable: in step S5', a limit condition (s<d, in FIG. 2 its opposite is used) is defined for the threshold value state variable s, i.e. a condition indicating whether the threshold value state variable lies outside a predefined limit (here: below the value d). If this limit condition is satisfied, a non-wait state (w=0) is in any case forced, regardless of the case distinction defined in S5. It is thus ensured by this limit condition (step S5') that a sequence of any length of wait states cannot occur. In other words, it is ensured that a minimum number of non-wait states takes place within a predefined time span. As already described above, this is advantageous, particularly in the case of real-time applications, since a prediction regarding the maximum delay of the application due to random wait states is thereby enabled.

The relative frequency of the occurrence of wait states depends on the constants u and d, and amounts to:

$$p = u/(u+d) \qquad (1)$$

assuming that the random source RNG generates evenly distributed and independent random bits (for derivation see below). In the embodiment described above, the mean value of the memory content s is then $p*2^n$. In the embodiment shown in FIG. 2 and described above, the initial starting value for the threshold value state variable s can therefore be set to $p*2^n$.

In general, an expected statistical mean value can be determined at the beginning of the method for the threshold value state variable s, and the threshold value state variable s can be initialized in such a way that it approximates the determined statistical mean value within a predefined accuracy. Thus, the threshold value state variable is located even at the beginning of the method in the vicinity of its statistical expectation value, and transient responses are largely avoided.

The probability distribution of the random wait states corresponds at least for a limited number of repetitions of the method approximately to a Bernoulli distribution. For long runs (very large number of repetitions) the effect of the upper and lower limitation of the memory content s makes itself increasingly evident. The length k of the comparator essentially determines how well a Bernoulli distribution is approximated. The value n−k defines how sluggishly the regulating mechanism responds by means of the variable threshold value t to a sequence of random wait states, i.e. up to what length runs of wait states can still be regarded approximately as Bernoulli-distributed.

If a cryptographic system uses random wait states and the wait states are generated according to the method described above, the number ws of wait states that can be included following z clocks of the cryptographic system satisfies the following inequality:

$$ws \leq p*z + s0/(u+d). \quad (2)$$

The right-hand side of inequality (2) thus defines the maximum number of wait states for a given initialization value s0, with which s has been initialized. Here, p is given by the equation (1). The inequality (2) can be interpreted as follows: the first summand is the expectation value for the number of wait states, and the second summand limits the maximum permitted, absolute deviation from the expectation value upwards. This interpretation also simultaneously justifies the interpretation of the parameter p defined in equation (1) as the frequency or probability of the wait states.

The inequality (2) can be derived as follows. A sequence of z states (wait states or non-wait states) is observed. The sequence comprises ws wait states and ns normal states, z=ws+ns, where ws and ns are initially undefined. s0 is taken as the value of the threshold value state variable s at the beginning of the generation of the state sequence of length z. The regulating mechanism described herein forces the following inequality to apply to s at any time, i.e. even after z states: $s = s0 + ns*u - ws*d \geq 0$.

If the substitution ns=z−ws is carried out and the inequality is resolved after ws, the limit for the number of wait states is as follows: $ws \leq s0/(u+d) + z*u/(u+d)$. This inequality corresponds to the inequality (2).

In any given segment of z consecutive clocks of the cryptographic system, the following inequality applies:

$$ws \leq p*z + (2^n - 1)/(u+d). \quad (3)$$

Inequality (3) is obtained from inequality (2) by setting $s0 = 2^n - 1$, which represents the limit case (maximum possible number of wait states).

The described method for generating random wait states thus offers the advantage that the method has a provable upper limit for the number of random wait states generated in a specific time interval (see inequalities (2) and (3)). It thus becomes possible to quantify the maximum occurring delay in the running of the application and to limit the performance loss through the use of random wait states. An upper limit of this type for the runtime of an application is very advantageous, particularly for real-time applications.

Secondly, the frequencies of the occurrence of random wait states (parameter p) can be set in a wide range. For the implementation, it is merely necessary that the required frequency is representable as a fraction with a small numerator (u) and a small denominator (u+d). In this way, frequencies whose numerical value can only be approximated with difficulty by powers of two can also be implemented.

The method can be implemented relatively compactly in hardware and can therefore be additionally integrated into existing designs. Although the comparator and adder/subtracter components used incur relatively high circuit costs, their parameters can be adapted and optimized in a simple manner for the relevant application. Practical experiments have shown that it is frequently sufficient if the comparator has a length k which is shorter than the length n of the threshold value state variable. In this way, the number k of random bits necessary for a run of the described algorithm can be reduced. If the required value for the frequency of wait states is close to 0 or close to 1, the binary representation of the corresponding number has leading 0 or 1 bits. The value of these leading bits does not have to be either stored in s or checked in the comparator. The length of the comparator and also of the memory for the threshold value state variable s can thereby be reduced.

An exemplary embodiment for the hardware implementation of the method is indicated below in the hardware description language VHDL. The program is not complete. Only the relevant components are described. The other components are, however, immediately understandable to the person skilled in the art.

In the example, the memory S for the threshold value state variable s consists of n=11 bits, the comparator has a length k=6, and in each case 8 random bits are required. The frequency of the random wait states is intended to be 2/11=2/(2+9). According to equation (1), this can be achieved by selecting the parameters u and d as u=2 and d=9. Since the binary representation of the fraction 2/11=0.001011101 begins with two leading 0 bits, the highest bit is not stored in S. The initial value w is $2/11*2^{12} = 101110100$ in binary representation. In VHDL, the method can be expressed as follows:

```
signal wait_next_state: std_logic;
signal s: std_logic_vector(10 downto 0);
signal r: std_logic_vector(7 downto 0);
process (clock, reset)
begin - - process
if (reset='1') then - - asynchronous reset
a) s<="01011101000"; - -=probability 2/11 of wait state
b) wait_next_state<='0';
c) elsif (clock'event and clock='1') then
   check whether next state is a wait state
d) if ((r(7)='0') and (r(6 downto 0)<s(10 downto 4))) then
e) wait_next_state<='1'; - - next state is wait state
f) s<=s-9;
g) else
h) wait_next_state<='0'; - - next state is non-wait state
i) if (s(10 downto 1)/="1111111111") then
j) s<=s+2;
k) else
l) s<=s; - - Overflow, leave s unchanged
m) end if;
n) end if;
end if;
end process;
```

Figure 4A:
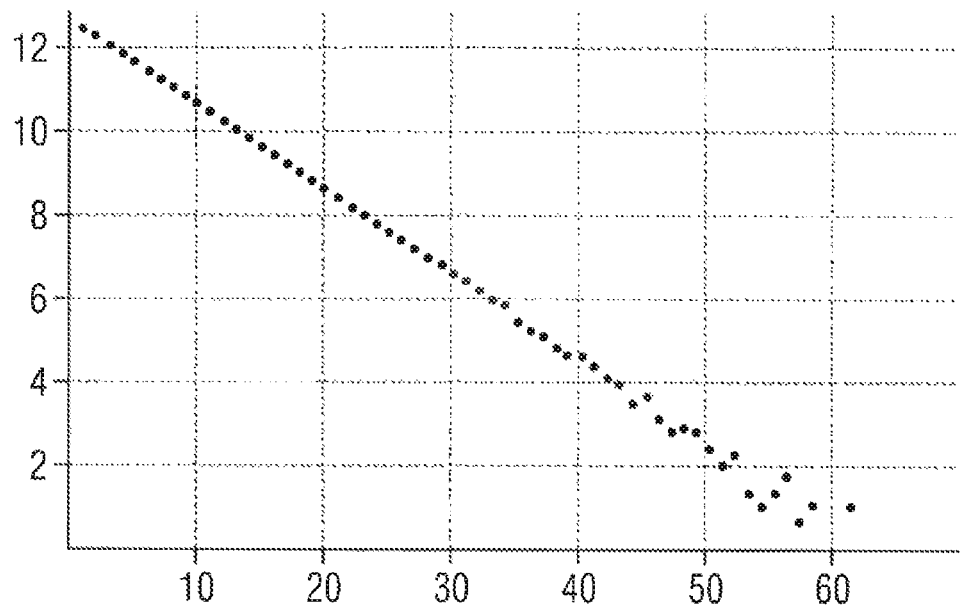
FIGS. 4a and 4b show the statistical distribution of non-wait states and wait states according to one embodiment.
Figure 4B:
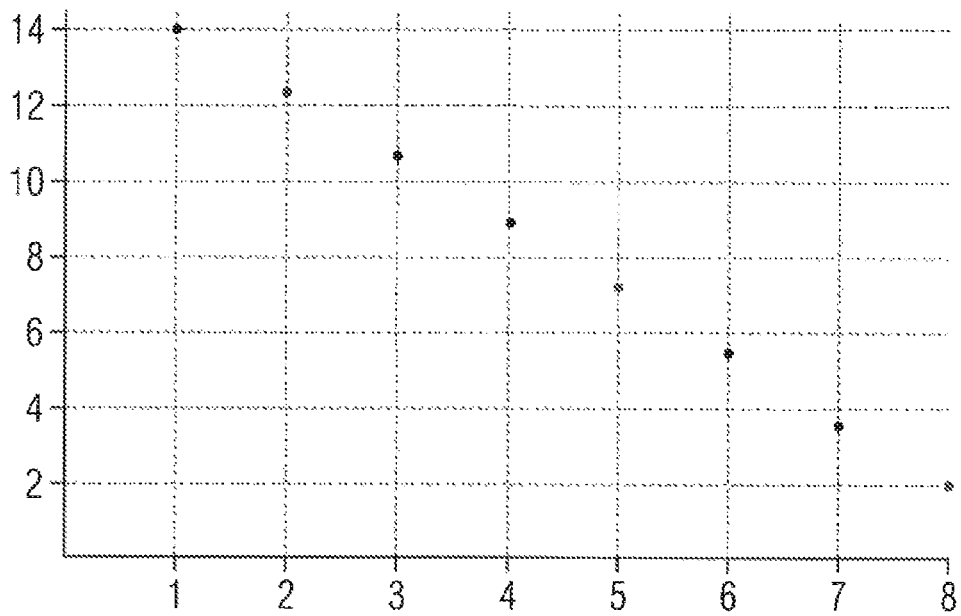
Figure 5:
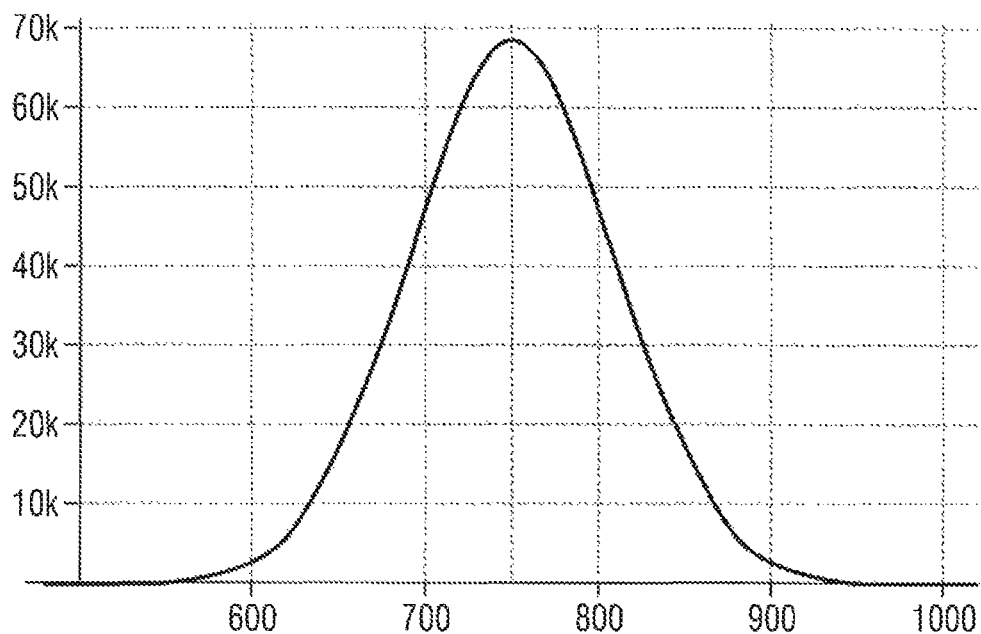
FIG. 5 shows the statistical distribution of the threshold value state variable according to one embodiment.

FIGS. 4a to 5 show the results of a statistical evaluation of properties of a sequence of wait states and non-wait states which was generated according to the exemplary embodiment described above. FIG. 4a shows the distribution of runs of non-wait states for 10 million clocks for the described example in logarithmic representation. The horizontal axis indicates the length of the runs, i.e. how many clocks an uninterrupted sequence of non-wait states between wait states lasted. The vertical axis shows the base two logarithm of the number of runs. No deviations from the statistical ideal (Bernoulli distribution) are evident.

FIG. 4b shows the distribution of runs of wait states for 10 million clocks for the described example in logarithmic representation. The horizontal axis indicates the length of the runs, i.e. how many clocks an uninterrupted sequence of non-wait states between wait states lasted. The vertical axis shows the base two logarithm of the number of runs. Here also, no deviations from the statistical ideal are evident.

FIG. 5 illustrates the distribution of the threshold value state variable s for 10 million system clocks for the example shown. The horizontal axis represents the value of the threshold value state variable s, and the vertical axis indicates how often this value occurred for the 10 million clocks. It is evident that the value is approximately normally distributed over a relatively wide range, but this range is not left due to the regulation.

As can be seen in FIGS. 4a and 4b, the probability distributions for runs of wait states and runs of normal system clocks of a short length behave approximately as Bernoulli distributions. The sequence of random wait states which are generated during the running of an application thus have good statistical properties. In particular, in comparison with alternative solution approaches, a plurality of immediately consecutive wait states are possible and correlations between wait states temporally close to one another are low.

Different variants for the implementation of the method according to the invention are possible.

In the method described herein, specific operations can be implemented through equivalent operations known to the person skilled in the art. For example, w=0 can represent a wait state and w=1 a non-wait state. In this case, w can simply be substituted by 1−w in the description above. Conditions can also be expressed by their opposite. For example, the condition "if s<d then A else B" can also be implemented by "if s≥d then B else A".

In a similar manner, a dual representation for the algorithmic description of the method described herein can also be achieved by transposing the lower and upper limit for s. In this case, the constant u is added if the algorithm generates a wait state in the next clock. Otherwise, the constant d is subtracted. The comparator then checks whether r>t applies. In this case, the frequency for random wait states is p=d/(u+d). In this case, the mean value of the memory content s is $p*2^n$.

The lower limits and upper limits for s do not have to be set to the respective maximum values, d and $2^n-u$, as described above. By selecting different values or different limit conditions, the range around the mean value for the memory content s can, for example, be symmetrically designed and/or more narrowly restricted. In this way, for example, different real-time requirements can be implemented in which non-wait states have to be more frequently forced. The deviating behavior of the statistics of longer runs of wait states or runs of normal system clocks can also be aligned.

In the embodiments described above, it has been described how the generation of further wait states can be suppressed if the memory content approaches the value 0 or a first (lower) limit condition is satisfied (see step S5' in FIG. 2). In a further embodiment, the generation of a wait state can additionally be forced if the memory content approaches its maximum value $2^n-1$ or a second (upper) limit condition is satisfied (e.g. under the condition b2 of FIG. 2). In this way, it is also possible to show a non-trivial lower limit for the number ws of random wait states which may be included in any given segment of z consecutive clocks of the cryptographic system. In this case, the following inequality applies:

$$p*z - 2^n/(u+d) < ws \leq p*z + (2^n-1)/(u+d) \quad (4)$$

The left-hand side of this inequality (4) can be derived analogously to inequalities (2) and (3), while the right-hand side corresponds to inequality (3). If, instead of a segment from the calculation, the entire sequence of clocks of the cryptographic system is observed (beginning with the initialization of S with the starting value s0), the following correspondingly applies:

$$p*z - (2^n-s0)/(u+d) < ws \leq p*z + s0/(u+d) \quad (5)$$

Figure 3B:
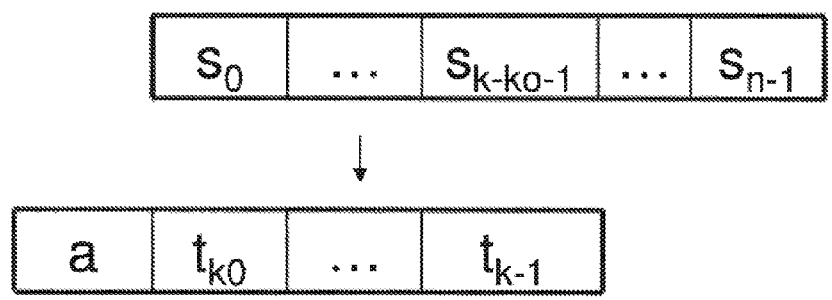

A further variant is shown in FIG. 3b, in which an alternative threshold value allocation between the threshold value state variable s and the threshold value t is shown, which can be used instead of the allocation illustrated in FIG. 3a. Here, the most significant bits a for the threshold value t are given by a permanently predefined bit sequence $a=(a_0, \ldots, a_{k_0-1})$ (bit length k0≤k), and only the least significant (k−k0) bits of t are transferred from s, e.g. as the (k−k0) most significant bits of s. In this way, the variation of the probability for wait states on the basis of the variable threshold value t is limited. An extreme case is achieved by holding t constant on the whole (corresponding to the case in FIG. 3a where k0=k). However, it is preferred that at least one bit of the threshold value t depends variably on the threshold value state variable s.

Terms such as "first", "second", and the like, are used herein to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method for generating random wait states by a computer processor, the method comprising the steps of:
   a) obtaining a threshold value (t) from a threshold value state variable (s) by means of a threshold value allocation; b) comparing the threshold value (t) with a random number (r), and, depending on the comparison, setting a wait state indicator (w) to a first value or to a second value, wherein one of these values represents a wait state and the other a non-wait state, in accordance with:
   b1) if the random number (r) is less than the threshold value (t), the wait state indicator (w) is set to the first value, and a first calculation rule (R1) which does not increase the allocated threshold value (t) is applied to the threshold value state variable(s);
   b2) if the random number (r) is greater than the threshold value (t), the wait state indicator (w) is set to the second value, and a second calculation rule (R2) which does not reduce the allocated threshold value (t) is applied to the threshold value state variable(s);

b3) at least in one of b1) and b2), a first limit condition for the threshold value state variable (s) is checked, and if the first limit condition is satisfied, regardless of b1) and b2), the wait state indicator (w) is forcibly set to the value representing the non-wait state; and c) determining whether to initiate the wait state based on whether the wait state indicator(w) is set to the first or second value.

2. The method according to claim 1, wherein steps a) to c) are repeated several times.

3. The method according to claim 1, wherein step b) further includes, in at least one of b1) and b2), checking a second limit condition for the threshold value state variable (s), and if the second limit condition is satisfied, regardless of b1) and b2), forcibly setting the wait state indicator (w) to the value representing the wait state.

4. The method according to claim 3, wherein the first limit condition is one of non-exceeding of a predefined upper limit for the threshold value state variable (s) and non-understepping of a predefined lower limit for the threshold value state variable (s); and wherein the second limit condition is the other of these conditions.

5. The method according to claim 1, wherein the first limit condition is one of non-exceeding of a predefined upper limit for the threshold value state variable (s) and non-understepping of a predefined lower limit for the threshold value state variable (s).

6. The method according to claim 1, wherein the first value represents the non-wait state and the first limit condition is checked at least for b2).

7. The method according to claim 1, wherein the first value represents the wait state and the first limit condition is checked at least for b1).

8. The method according to claim 1, wherein the first calculation rule (R1) comprises the subtraction of a first value (d) from the threshold value state variable (s) if doing so does not understep a predefined lower limit, and wherein the second calculation rule (R2) comprises the addition of a second value (u) to the threshold value state variable (s) if doing so does not exceed a predefined upper limit.

9. The method according to claim 1, wherein the threshold value allocation comprises a direct use of a subset of bits of the threshold value state variable (s) as bits of the threshold value (t).

10. The method according to claim 7, wherein the threshold value state variable (s) is a number ($s_0, \ldots, s_{n-1}$) with a bit length n, and wherein the threshold value allocation comprises the use of k≤n bits ($s_0, \ldots, s_{k-1}$) of the threshold value state variable as at least a part of the threshold value (t).

11. The method according to claim 10, wherein the k bits of the threshold value state variable (s) used as at least a part of the threshold value (t) are the most significant bits of the threshold value state variable (s).

12. The method according to claim 1, further comprising:
determining an expected statistical mean value for the threshold value state variable (s); and
initializing the threshold value state variable (s) to approximate the statistical mean value within a predefined accuracy.

13. A device for processing digitally stored data, the device comprising circuitry operable to:

a) obtain a threshold value (t) from a threshold value state variable (s) by means of a threshold value allocation;

b) compare the threshold value (t) with a random number (r), and, depending on the comparison, set a wait state indicator (w) to a first value or to a second value, wherein one of these values represents a wait state and the other a non-wait state, in accordance with:

b1) if the random number (r) is less than the threshold value (t), the wait state indicator (w) is set to the first value, and a first calculation rule (R1) which does not increase the allocated threshold value (t) is applied to the threshold value state variable (s);

b2) if the random number (r) is greater than the threshold value (t), the wait state indicator (w) is set to the second value, and a second calculation rule (R2) which does not reduce the allocated threshold value (t) is applied to the threshold value state variable (s); and b3) at least in one of b1) and b2), a first limit condition for the threshold value state variable (s) is checked, and if the first limit condition is satisfied, regardless of b1) and b2), the wait state indicator (w) is forcibly set to the value representing the non-wait state; and c) determine whether to initiate the wait state based on whether the wait state indicator (w) is set to the first or second value.

14. The device according to claim 13, wherein the circuitry is operable to repeat steps a) to c) several times.

15. The device according to claim 13, wherein the circuitry is further operable to, in at least one of b1) and b2), check a second limit condition for the threshold value state variable (s), and if the second limit condition is satisfied, regardless of b1) and b2), forcibly set the wait state indicator (w) to the value representing the wait state.

16. The device according to claim 13, wherein the first limit condition is one of non-exceeding of a predefined upper limit for the threshold value state variable (s) and non-understepping of a predefined lower limit for the threshold value state variable (s).

17. The device according to claim 13, wherein the first value represents the non-wait state and the circuitry is operable to check the first limit condition at least for b2).

18. The device according to claim 13, wherein the first value represents the wait state and the circuitry is operable to check the first limit condition at least for b1).

19. The device according to claim 13, wherein the first calculation rule (R1) comprises the subtraction of a first value (d) from the threshold value state variable (s) if doing so does not understep a predefined lower limit, and wherein the second calculation rule (R2) comprises the addition of a second value (u) to the threshold value state variable (s) if doing so does not exceed a predefined upper limit.

20. The device according to claim 13, wherein the circuitry is further operable to determine an expected statistical mean value for the threshold value state variable (s) and initialize the threshold value state variable (s) so that the threshold value state variable (s) approximates the statistical mean value within a predefined accuracy.

* * * * *